United States Patent
Ha

(10) Patent No.: US 6,765,698 B1
(45) Date of Patent: Jul. 20, 2004

(54) APPARATUS FOR DRIVING SCANNER AND METHOD THEREOF

(75) Inventor: Jong-Ho Ha, Kyonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/567,118

(22) Filed: May 8, 2000

(30) Foreign Application Priority Data

May 7, 1999 (KR) ........................................ 1999-16279

(51) Int. Cl.[7] ................................................ H04N 1/04
(52) U.S. Cl. ........................ 358/474; 358/497; 358/505; 358/500; 358/515
(58) Field of Search ................................ 358/412, 505, 358/500, 486, 400, 471, 474, 497, 494; 318/696, 685

(56) References Cited

U.S. PATENT DOCUMENTS

| | | | |
|---|---|---|---|
| 5,523,858 A | * 6/1996 | Yamada et al. | 358/412 |
| 5,793,399 A | * 8/1998 | Kawakami et al. | 347/104 |
| 5,805,310 A | * 9/1998 | Jean et al. | 358/498 |
| 5,854,696 A | * 12/1998 | Yun | 358/498 |
| 6,019,363 A | * 2/2000 | Ahn | 271/10.05 |
| 6,341,010 B1 | * 1/2002 | Kurosawa | 355/75 |

FOREIGN PATENT DOCUMENTS

JP       402146861 A    * 6/1990

* cited by examiner

Primary Examiner—Edward Coles
Assistant Examiner—Heather D Gibbs
(74) Attorney, Agent, or Firm—Robert E. Bushnell, Esq.

(57) ABSTRACT

An apparatus for driving a scanner includes a driving motor which is rotated in both directions, a driving gear which is driven by the driving motor, a driving pulley which rotates a timing belt coupled to the scanner body, a reduction gear which is engaged with a gear portion of the driving pulley, a power transmitting unit for directly transferring a rotational force of the driving gear to the driving pulley or transferring the rotational force through the reduction gear to the driving pulley, where, when reading a colored image, the driving force is decelerated and then transferred to the driving pulley under the same speed of the driving motor as a case of reading a black-and-white image, in accordance with the rotating direction of the driving motor.

18 Claims, 2 Drawing Sheets

APPARATUS FOR DRIVING SCANNER AND METHOD THEREOF

CLAIM OF PRIORITY

This application makes reference to, incorporates the same herein, and claims all benefits accruing under 35 U.S.C. §119 from my application APPARATUS FOR DRIVING SCANNER AND METHOD THEREOF filed with the Korean Industrial Property Office on the 7$^{th}$ day of May 1999 and there duly assigned Ser. No. 16279/1999.

BACKGROUND OF THE INVENTION

1. Field of the Invention

The present invention relates to an apparatus and process for driving a scanner, and, more particularly, to an apparatus and process able to minimize vibrations and noise generated while reading color images.

2. Description of the Related Art

Generally, a scanner is an electro-optical apparatus that converts the images forming the contents of a document, a picture or a film and the like, into digital data so that the digital data may be either stored in a computer or transferred through a communication circuit. The scanner converts images into graphic files and also converts the contents of a book or a document into character data that can be recognized by the computer driven by proper character recognition software.

The basic operating principle of the scanner depends upon light that is scanned onto the surface of a document such as a cut sheet of a printable medium, so as to generate voltages that vary in proportion to the amount of light reflected from the surface, and then form a pattern of pixels that correspond to the voltage. Scanners are classified as either color scanners or black-and-white scanners, in accordance with the type of image sensor incorporated into the scanner, and are further classified as either a hand-scanner that is held in a user's hand while being used, a sheet feeding type of scanner in which a document is fed and read like in an ink-jet printer, or a flat bed type scanner, a widely used instrument in which a document is laid upon a glass plate and an image sensor reads the images borne by the surface of the document while the sensor is moved beneath the glass plate.

Flat bed type scanners use a driving motor which moves image sensors across incrementally successive lines of the images. The scanning of colored images requires a step motor that serves as the motive power of the scanner to drive three different light sources for red, green and blue colored components within each line of the images being scanned. Consequently, the scanning time for each line of the image is at least three times slower when scanning colored images than when scanning black-and-white images. Although the step motor used to the image sensors may be driven at high speed when scanning black and white images because the scanning time per line is short, the driving speed of the motor must be reduced by more than one-third when scanning colored images in order to accommodate passage of each of the image sensors. I have noticed that the step motor, as a driving source of the scanner, generates intense vibrations during its low speed mode while scanning colored images. This creates a problem by lowering image quality and, at the same time, causes intense noise to be generated by the vibration while reading colored images.

SUMMARY OF THE INVENTION

It is therefore an object of the present invention to provide an improved apparatus and process for converting images into binary data.

It is another object to provide an apparatus and process for driving a scanner to convert both black-and-white and colored images into binary data.

It is still another object to provide a scanning apparatus and process with a stepping motor that is driven at a high speed regardless of whether black-and-white images or color images are being scanned.

It is yet another object to provide an apparatus and process that uses a motor able to drive an image sensor with reduced occurrence of vibration and noise while reading colored images.

These and other objects may be achieved with an apparatus for driving a scanner with a driving motor that is rotated in both directions, a driving gear driven by the driving motor, a driving pulley that rotates a timing belt coupled to the scanner's body, a reduction gear that engages a gear portion of the driving pulley, a power transmitter that directly transfers rotational force from the driving gear to the driving pulley or transfers the rotational force through the reduction gear to the driving pulley. When reading a colored image, the driving force is decelerated and then transferred to the driving pulley while the driving motor rotates at the same speed as a when reading a black-and-white image, in accordance with the rotating direction of the driving motor.

Preferably, the power transmitting unit includes planetary gears which are engaged with the driving gear so as to revolve on the driving gear in accordance with the rotating direction of the driving gear and selectively engaged with the gear portion of the driving pulley. A connecting arm is rotatably coupled to the driving gear, and the planetary gears are respectively rotatably mounted at both ends of the connecting arm so as to be engaged with the driving gear.

Further, in other aspect of the present invention, there is provided a method for driving a scanner, having the steps of rotating a driving gear by a driving motor; transferring a rotational force of the driving gear to a driving pulley; rotating a timing belt by the driving pulley; driving a scanner body which is coupled to the timing belt, where the driving gear directly transfers a rotational force to the driving pulley when the driving motor is rotated clockwise, and the rotational force of the driving gear is transferred through a reduction gear to the driving pulley when the driving motor is rotated counter-clockwise so that a black-and-white image and a color image are read at an equal speed of the driving motor.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein:

FIGS. 2 and 3 are views showing the construction and operating states of an embodiment of an apparatus for driving a scanner according to the present invention, with:

DETAILED DESCRIPTION OF THE INVENTION

Figure 1:
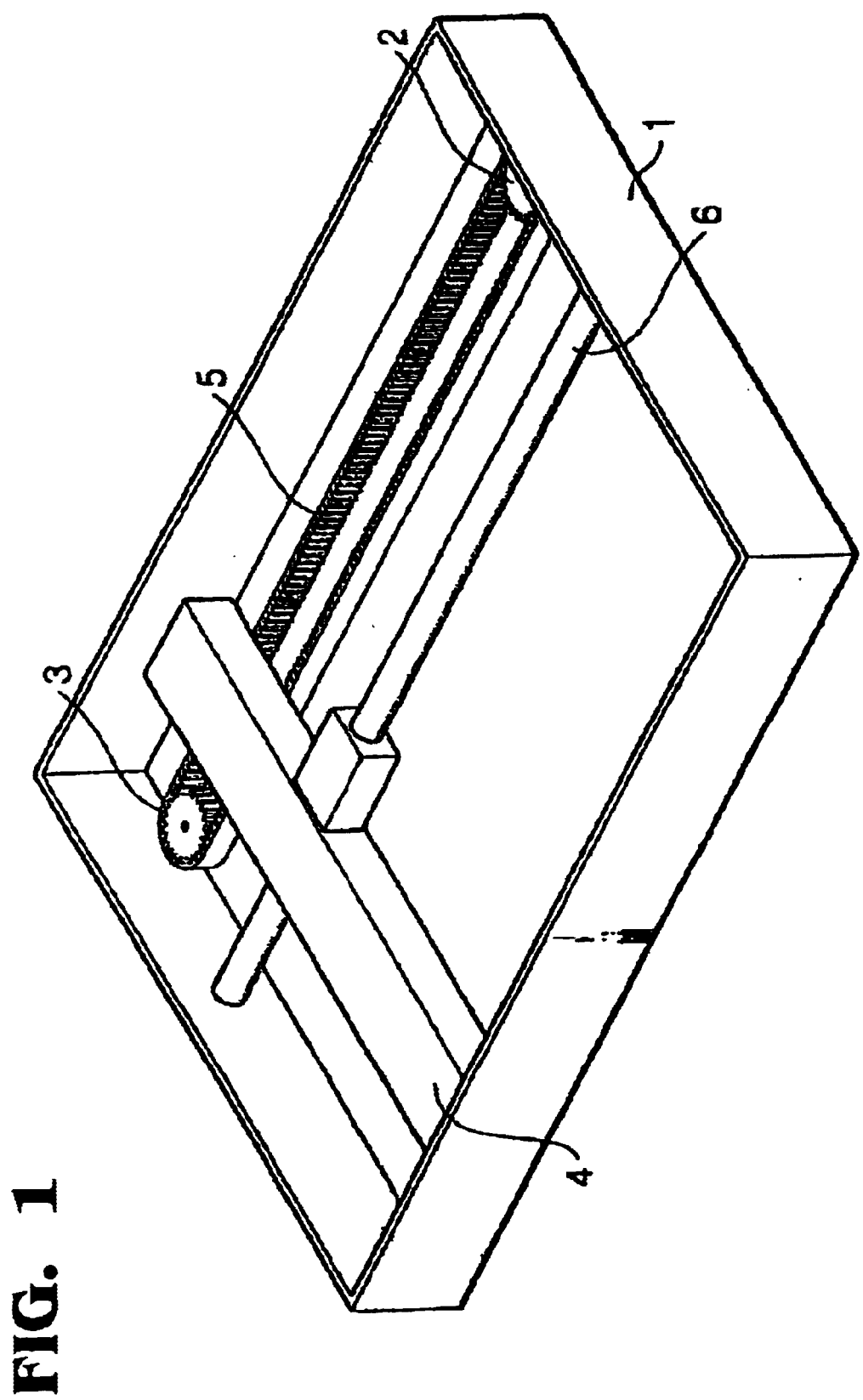
FIG. 1 is a perspective view showing an apparatus for driving a scanner suitable for the practice of the principles of the present invention.

Turning now to the drawings, FIG. 1 illustrates a flat bed type scanner constructed with a driving motor (not shown) that may be disposed at a side of a main frame 1, a driving pulley 2 driven by a driving gear (not shown) that is in turn driven by the driving motor, an idler pulley 3 mounted opposite to driving pulley 2, a timing belt 5 circularly extending around and operationally coupling driving pulley 2 and idler pulley 3. The main body 4 of the scanner is coupled to and is moved by timing belt 5 along a shaft 6 that extends across main frame 1 so as to guide the movement of main body 4 of the scanner. In order to precisely control the position of main body 4, a step motor is often used as the driving motor. The step motor rotates incrementally by a regular step angle in response to a pulse signal applied to an input terminal of the scanner.

In flat bed type scanners, the scanning time required per line by the image sensor is determined by the performance of the image sensor itself and by whether the image being scanned is a colored or black-and-white image. Black-and-white images can be read with a single reading action, that is, with one pass of main body 4; consequently the scanning time per line is fast. With colored images however, the reading action should be repeatedly performed at the same position while using three different light sources for red, green and blue colored components. Consequently, the scanning time per line is at least three times slower for colored images than for black-and-white images. The step motor used to drive main body 4 and the image sensor may be driven at high speed when scanning black and white images because the scanning time per line is short. With colored images however, the driving speed of the motor is reduced by more than one-third. I have noticed that the step motor, as a driving source of the scanner, generates intense vibrations during its low speed mode while scanning colored images. This creates a problem by lowering image quality and, at the same time, causes intense noise to be generated by the vibration while reading colored images.

Figure 2A:
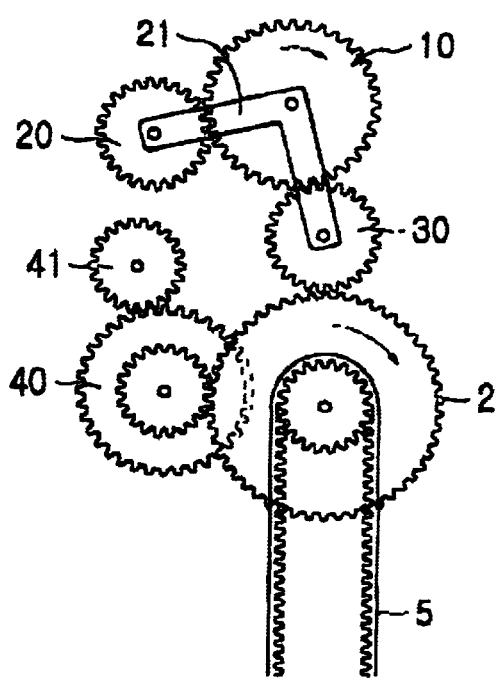
FIG. 2a being a view showing an operating state when reading a black-and-white image.
Figure 2B:
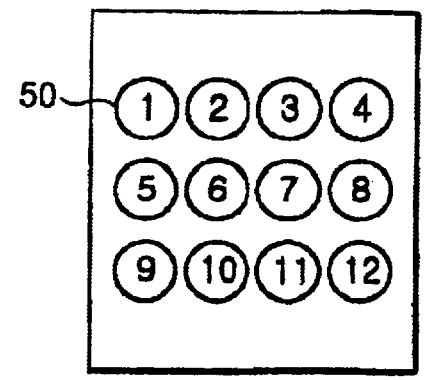
FIG. 2b being a view showing the order for storing the image when reading the black-and-white image.
Figure 3A:
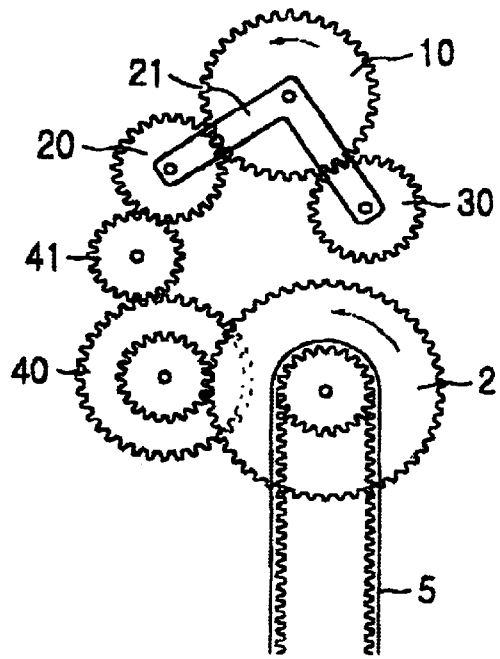
FIG. 3a being a view showing an operating state when reading a colored image.
Figure 3B:
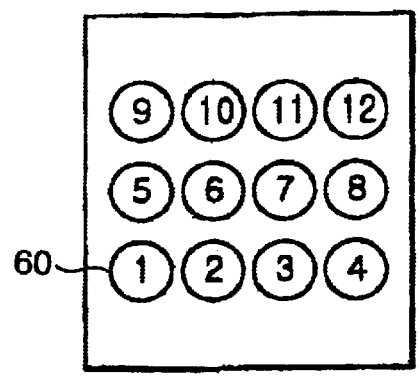
FIG. 3b being a view showing the order of storing the image when reading the colored image.

FIGS. 2A, 2B, 3A and 3B are generally views showing constructions and operating states of an embodiment of an apparatus for driving a scanner according to the present invention. FIG. 2a is a view showing an operating state when reading out a black-and-white image. FIG. 2b is a view showing the order of storing the image when reading out the black-and-white image. The numbers 50 depicting the sequence of storage. FIG. 3a is a view showing an operating state when reading out a colored image. FIG. 3b is a view showing the order of storing the image when reading out the colored image. The numbers 60 depicting the sequence of storage.

As shown in FIGS. 1, 2a and 2b, an apparatus for driving a scanner according to the present invention includes a step motor (not shown), a driving gear 10 which is rotatably mounted to a driving shaft of the step motor, first and second planetary gears 20, 30 which are driven by the driving gear 10, a driving pulley 2 which is apart from the driving gear 10 at a distance and selectively engaged with the planetary gears 20, 30, a timing belt 5 which is mounted between the driving pulley 2 and an idle pulley 3 opposite to the driving pulley 2 and to which a scanner body 4 is coupled.

A gear portion of the driving pulley 2 is engaged with a reduction gear 40. The reduction gear 40 is engaged with an idle gear 41 which is engaged with the first planetary gear 20 so as to transfer a rotational force through the reduction gear 40 to the driving pulley 2. The first and second gears 20 and 30 are respectively engaged via a connecting arm 21 with the driving gear 10 and revolve on a circumference of the driving gear 10 at an angle in accordance with the rotating of the driving gear 10. However, if the first planetary gear 20 is engaged with the idle gear 41 for power transmission, or the second planetary gear 30 is engaged with the gear portion of the driving pulley 2, the first and second gears 20 and 30 selectively transfer the driving force of the driving gear 10 to the idle gear 41 or the gear portion of the driving pulley 2. That is, according to the rotational direction of the step motor, the driving force of the driving gear 10 is directly transferred to the driving pulley 2 or decelerated through the reduction gear 40 and then transferred to the driving pulley 2.

The operation of the scanner according to the present invention is divided into two cases of reading a black-and-white image or a colored image. A control part controls the rotational direction of the step motor in accordance with a kind of a document (i.e., the black-and-white image or the colored image). An initial position of the step motor is set to be contrary in accordance with the kind of the document. First, when reading the black-and-white image, a positive polarity is applied to the step motor so that the driving gear 10 is rotated clockwise. Due to the rotating of the driving gear 10, the second planetary gear 30 is engaged with the driving pulley 2 and the revolving of the first and second planetary gears 20 and 30 are thus stopped.

The driving pulley 2 is rotated by the rotational force from the second planetary gear 30. Thus, the timing belt 5 is rotated to move the scanner body 4. As shown in FIG. 2, the black-and-white image data read through a charge coupled device (CCD) sensor of the scanner body 4 is forward stored to an image memory. If reading operation is completed, the scanner body 4 is returned to its initial position. Meanwhile, when reading the colored image, the scanner body 4 is set at a position opposed to the case of reading the black-and-white image. If a power source is applied to the step motor so that the driving gear 10 is reversely rotated, the first and second planetary gears 20 and 30 are revolved counter-clockwise. When the first planetary gear 20 is engaged with the idle gear 41, the rotation of the first and second planetary gears 20 and 30 is stopped. The driving force transferred to the idle gear 41 is decelerated through the reduction gear 40 and then transferred to the driving pulley 2.

The driving pulley 2 receives the driving force of the driving gear 10 through the first planetary gear 20 and the idle gear 41 so as to reversely move the scanner body 4 at a lower speed. The colored image data read through the charge coupled device sensor of the scanner body 4 is stored in a direction opposed to the case of reading the black-and-white image, as shown in FIG. 3b.

As described above, the colored image data is stored to the image memory in a direction opposed to the case of reading the black-and-white image. When the colored image date is stored in a computer or printed however, the storing direction of the image data is compensated by the control part so as to be in the same direction as the document, i.e. the case of reading the black-and-white image.

As described above, according to the apparatus for driving the scanner of the present invention, when reading the colored image, the step motor can be driven at a high speed, while the scanner body is driven at a lower speed, thereby minimizing the vibration of the step motor and thus the noise.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. An apparatus for driving a scanner, comprising:

a driving motor rotated in both directions;

a driving gear driven by the driving motor;

a driving pulley rotates a timing belt coupled to the scanner body, the scanner body reading image data;

a reduction gear being engaged with a gear portion of the driving pulley; and a power transmitting unit directly transferring a rotational force of the driving gear to the driving pulley or transferring the rotational force through the reduction gear to the driving pulley;

wherein, when reading a color image, a driving force from the driving gear is decelerated and then the driving force is transferred to the driving pulley under the same speed of the driving motor as when reading a black-and-white image, in accordance with the rotating direction of the driving motor.

2. The apparatus according to claim 1, with the power transmitting unit comprising planetary gears being engaged with the driving gear to revolve on the driving gear in accordance with the rotating direction of the driving gear and selectively engaged with the gear portion of the driving pulley.

3. The apparatus according to claim 2, further comprising a connecting arm being rotatably coupled to the driving gear, the planetary gears being respectively rotatably mounted at both ends of the connecting arm to be engaged with the driving gear.

4. The apparatus according to claim 3, with the rotational direction of the driving gear selecting whether the driving force of the driving gear is directly transferred to the driving pulley or decelerated through the reduction gear and then transferred to the driving pulley.

5. The apparatus according to claim 1, with the rotational direction of the driving gear selecting whether the driving force of the driving gear is directly transferred to the driving pulley or decelerated through the reduction gear and then transferred to the driving pulley.

6. A method for driving a scanner, comprising of the steps of;

rotating a driving gear by a driving motor;

transferring a rotational force of the driving gear to a driving pulley;

rotating a timing belt by the driving pulley;

driving a scanner body coupled to the timing belt, the scanner body reading image data from a medium;

wherein the driving gear directly transfers a rotational force to the driving pulley when the driving motor is rotated clockwise, and the rotational force of the driving gear is transferred through a reduction gear to the driving pulley when the driving motor is rotated counter-clockwise so that a black-and-white image and a color image are read at an equal speed of the driving motor.

7. The apparatus according to claim 6, with the drive gear engaging with two planetary gears, the two planetary gears selectively engaging with the gear portion of the driving pulley according to the direction of rotation of the driving gear.

8. The apparatus according to claim 7, with the planetary gears having a connecting arm rotatably coupling the planetary gears to the driving gear, the planetary gears being respectively rotatably mounted at both ends of the connecting arm to be engaged with the driving gear.

9. An apparatus for driving a scanner, comprising:

a driving pulley rotating to drive a scanner body, the scanner body reading image data;

a reduction gear being engaged with a gear portion of the driving pulley; and a power transmitting unit directly transferring a rotational force to the driving pulley or transferring the rotational force through the reduction gear to the driving pulley, the power transmitting unit, when reading a color image, decelerating and transferring the rotational force to the driving pulley under the same speed when reading a black-and-white image.

10. The apparatus according to claim 9, with the power transmitting unit comprising a driving gear rotating according to a motor.

11. The apparatus according to claim 10, with the power transmitting unit further comprising a bar coupling a first gear and a second gear, the first gear and second gear engaging with the driving gear.

12. The apparatus according to claim 11, with the rotational direction of the driving gear selecting whether a driving force of the driving gear is directly transferred to the driving pulley or decelerated through the reduction gear and then transferred to the driving pulley.

13. The apparatus according to claim 10, with the power transmitting unit comprising planetary gears being engaged with the driving gear to revolve on the driving gear in accordance with the rotating direction of the driving gear and selectively engaged with the gear portion of the driving pulley.

14. The apparatus according to claim 13, further comprising a connecting arm being rotatably coupled to the driving gear, the planetary gears being respectively rotatably mounted at both ends of the connecting arm to be engaged with the driving gear.

15. The apparatus according to claim 9, further comprising an idle gear receiving a driving force from the power transmitting unit and transferring the driving force to the reduction gear.

16. The apparatus according to claim 9, with the rotational direction of the driving gear selecting whether the force of the driving gear is directly transferred to the driving pulley or decelerated through the reduction gear and then transferred to the driving pulley.

17. An apparatus for driving a scanner, comprising:

a first driving unit powered to impart rotational motion in both directions;

a second driving unit driving a scanner body through the first driving unit, the scanner body reading image data;

a reduction unit being engaged with the second driving unit; and a power transmitting unit directly transferring a force from the first driving unit to the second driving unit when reading a first type image and transferring the force through the reduction unit to the second driving unit when reading a second type image, when reading the second type image the power transmitting unit is decelerating and transferring the force through the reduction unit to the second driving unit under the same speed of the first driving unit when reading the first type image.

18. The apparatus according to claim 17, with the rotational direction of the first driving unit selecting whether the force of the first driving unit is directly transferred to the second driving unit or decelerated through the reduction unit and then transferred to the second driving unit.

* * * * *